July 4, 1944. G. L. HASSLER 2,352,833
CHOKE VALVE BOREHOLE INDICATING SYSTEM
Filed April 24, 1942 2 Sheets-Sheet 1
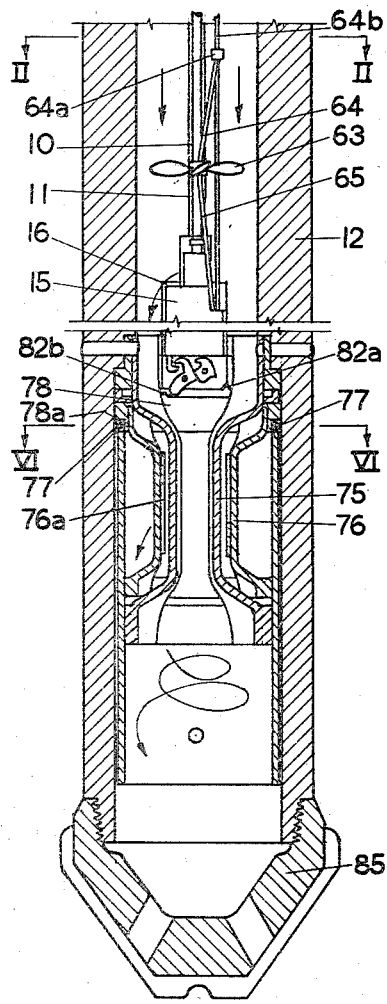
Fig. I
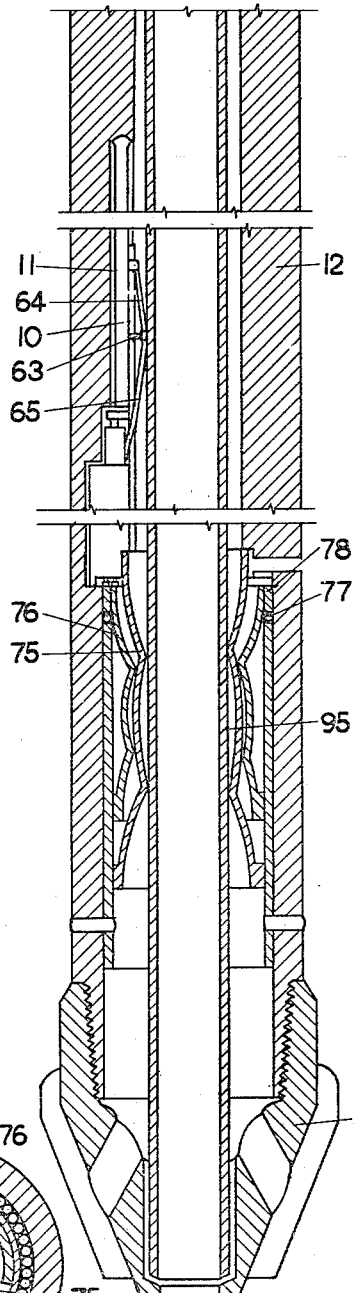
Fig. III
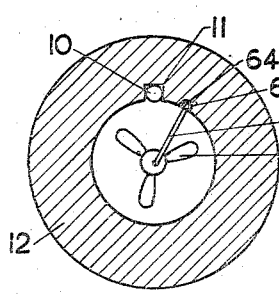
Fig. II
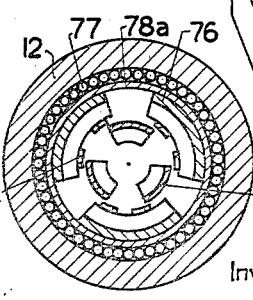
Fig. VI
Inventor: Gerald L. Hassler
By his Attorney:

July 4, 1944.  G. L. HASSLER  2,352,833
CHOKE VALVE BOREHOLE INDICATING SYSTEM
Filed April 24, 1942   2 Sheets-Sheet 2
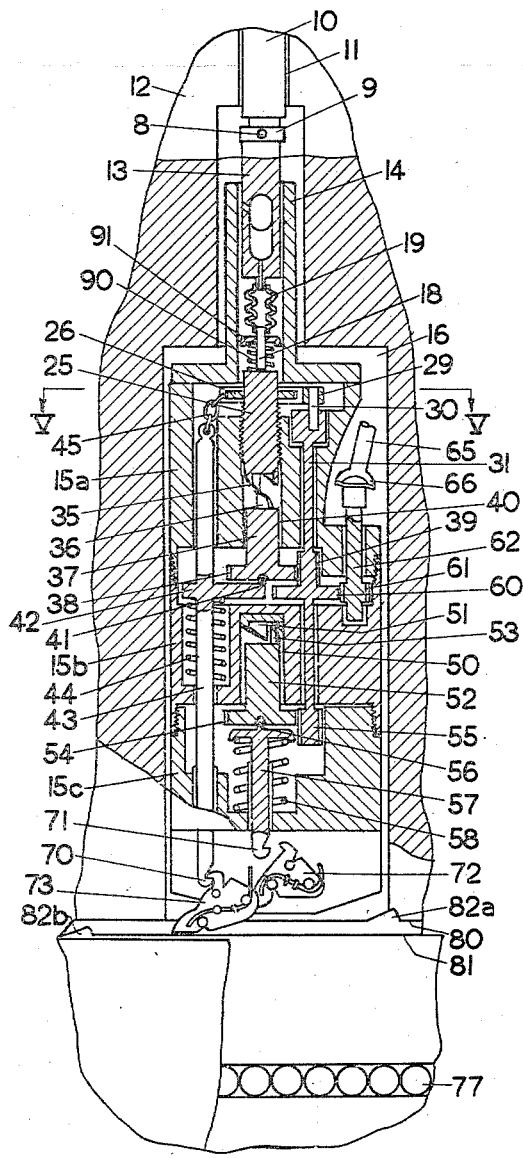
Inventor: Gerald L. Hassler
By his Attorney Patented July 4, 1944

2,352,833

UNITED STATES PATENT OFFICE 2,352,833

CHOKE VALVE BOREHOLE INDICATING SYSTEM

Gerald L. Hassler, Berkeley, Calif., assignor to Shell Development Company, San Francisco, Calif., a corporation of Delaware Application April 24, 1942, Serial No. 440,405

2 Claims. (Cl. 73—51)

The present invention relates to apparatus for transmitting signals to the surface from an instrument capable of detecting, observing or measuring the nature of the phenomena occurring in a borehole or the nature and characteristics of the formation traversed by said borehole, and pertains more particularly to apparatus for transmitting continuously a signal or a series of signals or vibrations through equipment or material in the borehole, such as the mud fluid, drill pipe or the like.

Various instruments have been proposed for measuring various properties in a borehole, but these devices are open to various objections. Since, when using self-contained recording instruments, there is considerable delay before the record is available to the driller, it has been proposed to use electrical conductors, sometimes together with synchronous motors, such as "Selsyn" motors and the like, to indicate immediately at the surface the measurements taken by the instrument. Due to the high cost of multi-wire insulated cables and their limitations with regard to their use in deep boreholes, such systems in many cases cannot be economically employed.

It is therefore an object of the present invention to provide a system for continuously indicating at the surface desired characteristics in a borehole without the necessity of using electrical cables or other directly-connecting means.

It is another object to provide a system comprising means to detect or measure a desired characteristic or feature in the borehole, means responsive to said measurements to transmit vibrations through the mud fluid or along the drill stem to the surface, and detecting and indicating means at the surface.

It is another object of this invention to provide an apparatus for transmitting to the surface decipherable signals responsive to the drilling variables such as of weight on the drill bit, rotational rate of the bit, bottom hole temperature and pressure, etc., whereby the driller may adjust said variables to their optimum values.

Other objects will be readily apparent from the following description taken in reference to the drawings, which illustrate several applications of the present method and apparatus therefor. In the drawings, Fig. I is a longitudinal sectional view of an embodiment of a device for indicating at the surface the weight actually applied to the drill bit.

Fig. II is a cross-sectional view taken along the line II—II in Fig. I.

Fig. III is a longitudinal sectional view taken of a right angle to the view in Fig. I and shows the point of attachment of the strain rod as well as the deformed position of the throttle vanes when a tube or tool is passed therethrough.

Fig. IV is an enlarged view, partially in section, of the throttle control mechanism, which view is taken along an arc as indicated by line IV—IV in Fig. V.

Fig. V is a cross-sectional view taken along the line V—V in Fig. IV.

Fig. VI is a cross-sectional view taken along the line VI—VI in Fig. I.

Fig. VII is a schematic view of the surface equipment at the well head.

Fig. VIII is a fragmentary view of the record chart of the mud flowmeter.

Generally, the present invention resides in the new apparatus for conducting continuously or for a predetermined period informative or control signals between the surface of a well and a device, such as a measuring or surveying instrument, in the borehole by means of vibrations, such as pressure or true sound waves, transmitted through usual material or equipment present in the borehole, such as through the fluid in the borehole, along the drill stem or pipe or any other suitable sound conducting channel, etc. This present apparatus for obtaining indications at the surface of desired measurements in the boreholes eliminates the use of expensive special signal conducting means, such as electrical cables, insulated drill strings and the like, which take considerable time to properly position in the borehole. Likewise, by means of the present invention, the measurements are instantly available to the driller or operator at the well head so that he may more accurately and efficiently control the drilling variables, such as the weight or load on the bit, rotational rate of the drill bit, bottom hole temperature and pressures, etc., and the positioning of various tools such as packers, liners, etc., as well as other operations, which depend on the nature of the borehole.

Suitable vibrations include low frequency pressure waves imparted to the column of drilling fluid in the borehole and for this purpose a throttling valve arranged in the mud flow stream may be used to impart pressure waves to the mud fluid column.

Various instruments and devices can be used with the principle of communication of the present invention. Thus, for example, a temperature or pressure measuring instrument containing a temperature or pressure-responsive vibration sender may be lowered by means of a wire line down through the drill string while drilling without the use of cumbersome and expensive electrical cables. If desired, such instruments may be incorporated in the drill collar or bit. Batteries or a rubber propeller in the mud stream may be used to actuate said instrument.

The present device for reporting the weight on the drill bit comprises means for converting the compression of the drill collar into pressure wave signals transmitted through the drilling mud to the surface is hereinafter described. Referring to Figure I—VIII, a preferred embodiment of a weight reporter comprises a strain rod 10 which lies in a longitudinal groove 11 in the internal wall of the drill collar 12. The upper end of the strain rod 10 is rigidly attached to the drill collar 12 and the movement of the free lower end in relation to the drill collar as the collar 12 is compressed due to the weight applied thereto is measured and converted to pressure wave signals by the following control mechanism.

Referring more particularly to Fig. IV, the lower end of the strain rod 10 is suitably connected, such as by means of a horizontal foot member 9 connected to strain rod 10 by screw 8 and attached to the upper end of a piston 13 adapted to reciprocate in a cylinder 14 which also forms the upper end and cover for a protective housing 15. The housing 15 comprises three body elements 15a, 15b and 15c and is contained in a recess 16 forming an extension and enlargement of the groove 11. A reciprocable contact member 18 is connected, preferably semi-flexibly, to the lower end of the piston 13, for example, by means of a bellows 19 filled with viscous oil.

A control micrometer 25 is threadably carried in the upper body element 15a of the housing and is adapted to be periodically rotated into contact with the contact member 18 which is carried by the strain rod 10. For this purpose a ratchet wheel 26 carried by the micrometer 25 is acted upon alternately by an advance pawl 27 and a back-away pawl 28 (Fig. V). These pawls 27 and 28 are carried by a cap member 29 which rides on an eccentric pin 30 carried on the end of rotating shaft 31, whereby the cap member 29 and pawls 27 and 28 are reciprocated by the rotation of the shaft. The advance pawl 27 is formed with a rounded head and upon engagement with the ratchet 26, the micrometer is caused to be moved up lightly against the contact lead member 18 on the strain rod 10. As the circular movement of the pin 30 continues, the advance pawl is retracted and the back-away pawl 28, which has a pointed head, is moved into engagement with the micrometer ratchet 26, whereby the micrometer 25 is quickly rotated a short distance away from the contact head 18.

The lower end of the micrometer screw 25 is formed with a drop-off cam 35 against which is pressed the eccentric drop-off pin 36 of a rotating member 37 having a gear 38 in meshing engagement with gear 39 on rotating shaft 31. The drop-off member 37 rotates in guide bore 40 and on an axial bearing or pivot 41 carried by a transverse arm 42 of a vertical reciprocable latch rod 43 which is urged upwardly by a coil spring 44. The latch rod 43 extends up to a position adjacent the back-away pawl 28 to which it is attached by means of a short chain 45. This chain or other suitable flexible connection prevents the back-away pawl 28 from actuating the micrometer 25 when the eccentric pin 36 is about ready to drop off from the cam 35.

In the upper end of a vertical bore 50 in the lower transverse face of the intermediate housing member 15b is a stationary drop-off cam 51. A lower rotating member 52 carrying an eccentric drop-off pin 53 is positioned in said bore 50 and is rotated by means of a gear 54 thereon engaging with a gear 55 on rotating shaft 31. The member 52 rotates on a pivot 56 carried by a reciprocable latch rod 57 which is urged upwardly by resilient means, such as a coil spring 58.

The shaft 31 which rotates the upper and lower eccentric carrying members 37 and 52 is rotated by means of a gear 60 thereon engaging a gear 61 on a shaft 62. Rotational motion is imparted to said shaft 62 by any suitable means, such as for example, a rubber propeller 63 carried in the mud stream by a shaft 65 (Fig. I), having a universal connection 66 to the shaft 62. The upper end of the propeller shaft 65 may be supported by a rod 64, the upper end of which is formed with a key 64a adapted to slide in vertical keyway 64b.

The lower ends of the reciprocable latch rods 43 and 57 are formed with hooks 70 and 71, respectively, which are adapted to engage with latching dogs 72 and 73, which are spaced at different radial distances from the axis of the drill collar 12.

Within the drill collar 12, directly below the latching dogs 72 and 73, are two sets of preferably flexible vanes 75 and 76 (Figs. I and VI) which selectively cooperate, as described below, to restrict intermittently the flow of mud fluid down through the drill collar 12. The lower ends of both sets of vanes 75 and 76 fit slidingly within the enlarged bore of the drill collar 12. The inner set of vanes 75 is stationary, being rigidly attached at the upper ends to the drill collar 12 and the outer set 76 is rotatable on a ball-bearing race-way 77 and, when free, is caused to rotate by a turbine action of the mud stream against spiral ribs 76a on the inner face of vanes 76. The upper collar 78 of the rotatable vanes 76 has a depending lip 78a, enclosing the race-way 77 and is provided with two radially-spaced transverse annular faces 80 and 81 along which the latching dogs 72 and 73 (Fig. IV) slide when the vanes 76 are rotated. The rotation of the vanes 76 is normally prevented by means of stops 82a and 82b spaced along the transverse annular faces 80 and 81, which stops 82a and 82b are so spaced as to be alternately engaged by the latching dogs 72 and 73.

The surface equipment may include, as shown in Fig. VII, a mud fluid pump 100, pressure bell 101, and a mud flow meter and recorder 102 together with the usual flow lines, derrick, rotary mud hose and swivel, rotary table, drill kelly, etc.

The illustrated preferred form of apparatus, including the rubber propeller 63 on a flexible shaft 65 and the flexible vanes 75 and 76, permits the introduction and passage therethrough of devices, such as, for example, as shown in Fig. III, a core barrel 95 adapted to cooperate with core bit 85a for taking core samples.

In operation, mud fluid flowing down through the drill string and drill collar 12 and out through the drill bit 85 causes the propeller 63, its shaft 65 and shaft 62 to be rotated, whereby shaft 31 together with members 30, 37 and 52 geared thereto is likewise rotated. The action of the pawls 27 and 28, which are carried by cap member 29 and are reciprocated by the action of eccentric pin 30 in cap member 29, causes the micrometer screw 25 to be alternately moved up lightly against the contact member 18 of the weight-responsive elements, including the strain rod 10, and then moved quickly away a short distance from said contact member 18. A coil spring 90, or other suitable resilient means, under compression between a shoulder 91 on the contact member and the micrometer 25 may be provided, if desired, to prevent shocks from being transferred from the strain rod to the micrometer 25.

At one point in the operational cycle, the rotatable set of vanes 76 is held against rotation due to time cycle-responsive latching dog 72 catching on a stop 82a on the inner annular face 80 (Fig. IV), when the lower rotating member 52 has carried the eccentric pin 53 around so that it drops off of the stationary cam 51, the sudden upward movement of the pivot-carrying latch rod 57 causes the hook 71 on the lower end of said rod 57 to engage with the latching dog 72 and moves the dog 72 out of engagement with the stop 82a, whereby the set of vanes 76 is released for rotation to a position at which the other latching dog 73 engages a stop 82b on the outer annular face 81, which position is shown in Fig. IV. In this position, the two sets of vanes 75 and 76 cooperate to restrict the mud fluid flow, thereby transmitting a pressure impulse to the well surface, where it may be detected as a rise in the pressure of the mud fluid or decrease in mud flow rate, as designated at 110 on the record chart 111 shown in Fig. VIII.

Thereafter, the eccentric pin 36 of the upper rotating member 37 drops off the face of the cam 35, at an angular position determined by the weight on the bit in terms of compression of the drill collar 12 as measured by the strain rod 10, and the action of the spring 44 causes the rod 43, together with the hook 70 thereon, to move upwardly suddenly, whereby the latching dog 73 is released from engagement with the stop 82b on the collar 78 of the rotatable vanes 76. The set of vanes 76 is thus allowed to move out of a mud flow restraining position to a position of open mud fluid flow, at which the first dog 72 engages with a stop 82a on the inner annular face 80. This causes another pressure impulse to be transmitted to the surface, where it may be detected as a decrease in mud fluid pressure or an increase in mud fluid flow rate as indicated at 112 on the record chart 111 shown in Fig. VIII.

As illustrated in Fig. VIII, the position of the point 112 between two consecutive points 110 is in direct relationship to the position or turn angle of the micrometer screw 25 and is thereby proportional to the weight on the drill bit 85 in terms of the compression of the drill collar 12. In other words, the proportion of the length of the low pressure interval a (from point 110 to 112) of the full cycle interval b (between two points 110) is a measure of the weight on the drill bit.

It has been found that high bit loads in general greatly reduce drilling costs, but such high loads cannot be used without careful control, since they are dangerous to hole and equipment. There is a critical load on the bit which is the optimum for every kind of rock and bit, such that more load or weight will burn out bits and cause too many round trips to replace them, and less load will waste time due to the resultant slower drilling. In deep drilling it is not possible to infer accurately the load on the bottom from measurements made at the surface, apparently because the friction of the returning mud causes a lifting effect upon the drill stem, depending on the rate of rotation, etc. Even if the drill pipe is balanced by an automatic weight control before rotation is begun, the drill pipe will sometimes be lifted out of the hole when the pipe starts to turn without any apparent change in the rate of mud flow. It may be seen that by means of the above-described weight reporter the optimum weight on the bit can be simply and easily maintained, whereby drilling speeds are increased and drilling costs thereby decreased.

It is readily apparent that various modifications and variations in such instruments as above described can be made without departing from the spirit of the present invention as defined by the accompanying claims. For example, signals responsive to other variables, such as temperatures, etc., which can be converted to an angular position of a drop-off cam, may be transmitted to the surface in a like manner. Thus, the inner free end of a temperature-responsive spiral Bourdon tube may be fastened to a rotatable drop-off cam, whereby changes in temperature are converted to the angular position of the zero point of the drop-off cam, which position can be transmitted to the well surface in a manner similar to that described above in relation to the weight-responsive transmitter.

I claim as my invention:

1. In a system for continuously obtaining at the surface of a well indications of the weight on the drill bit of a drill string, choke valve means in the lower portion of said drill string, means responsive to flow of drilling fluid through said valve means for rotating said choke valve means through fully open and flow-throttling positions, latching means normally preventing said rotation of said choke means and adapted to cause said valve means to be alternatively opened and closed as the latching means are temporarily released, an elongated member of relatively small cross-sectional area freely suspended from its upper end within the lower portion of the drill string, screw-threaded member adapted to be rotated into abutting engagement with the lower end of said elongated member, first drop-off cam means carried by said rotatable screw-threaded member, first rotating eccentric drop-off pin means adapted to be pressed against said first drop-off cam means, second and stationary drop-off cam means, second drop-off pin means adapted to be pressed against said second drop-off cam means, said first and second drop-off pin means being adapted to release temporarily the engagement of said latching means within said choke valve means when drop-off occurs, means for rotating said eccentric drop-off means, and means at the surface of the well for recording the pressure changes of the circulating drilling fluid in the drill string.

2. In a system for continuously obtaining at the surface of a well indications of a desired varying characteristic of the well borehole, a drill string depending into said borehole, choke valve means in the lower portion of said drill string, means responsive to flow of drilling fluid through said valve means for rotating said choke valve means through fully open and flow-throttling positions, latching means normally preventing said rotation of said choke means and adapted to cause said valve means to be alternatively opened and closed as the latching means are temporarily released, a rotatable member adapted to attain a rotary position responsive to said varying characteristic of the borehole, first drop-off cam means carried by said rotatable member, first rotating eccentric drop-off pin means adapted to be pressed against said first drop-off cam means, second and stationary drop-off cam means, second drop-off pin means adapted to be pressed against said second drop-off cam means, said first and second drop-off pin means being adapted to release temporarily the engagement of said latching means within said choke valve means when drop-off occurs, means for rotating said eccentric drop-off means, and means at the surface of the well for recording the pressure changes of the circulating drilling fluid in the drill string.

GERALD L. HASSLER.